United States Patent
Doberstein et al.

(10) Patent No.: US 9,042,856 B2
(45) Date of Patent: May 26, 2015

(54) METHOD AND APPARATUS FOR USING ERASURE TO IMPROVE SIGNAL DECODING DURING AN INTERFERENCE EVENT

(71) Applicant: MOTOROLA SOLUTIONS, INC, Schaumburg, IL (US)

(72) Inventors: Kevin G Doberstein, Elmhurst, IL (US); Yadunandana N Rao, Sunrise, FL (US); Charles R Ruelke, Margate, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 71 days.

(21) Appl. No.: 13/938,623

(22) Filed: Jul. 10, 2013

(65) Prior Publication Data

US 2015/0017941 A1  Jan. 15, 2015

(51) Int. Cl.
H04L 1/00 (2006.01)

(52) U.S. Cl.
CPC .................................. H04L 1/0045 (2013.01)

(58) Field of Classification Search
USPC ............... 455/63.1, 67.11, 67.13, 226.1, 295, 455/296, 305, 306; 375/341, 342, 343, 346, 375/349, 350
See application file for complete search history.

(56) References Cited

U.S. PATENT DOCUMENTS

| | | | |
|---|---|---|---|
| 5,942,003 A | 8/1999 | Ivry | |
| 6,115,593 A | 9/2000 | Alinikula et al. | |
| 6,760,438 B1 * | 7/2004 | Hui et al. | 455/423 |
| 6,874,115 B1 | 3/2005 | Laneman et al. | |
| 6,968,021 B1 | 11/2005 | White et al. | |
| 7,321,632 B2 | 1/2008 | Perets et al. | |
| 7,730,381 B2 | 6/2010 | Butala et al. | |
| 7,796,700 B2 | 9/2010 | Allpress et al. | |
| 7,836,373 B2 | 11/2010 | Lim et al. | |
| 7,848,464 B2 | 12/2010 | Hwang et al. | |
| 8,107,563 B2 | 1/2012 | Yoon et al. | |
| 8,150,325 B1 | 4/2012 | Prichard | |
| 8,238,487 B2 | 8/2012 | Lou et al. | |
| 8,385,479 B2 * | 2/2013 | Lee et al. | 375/341 |
| 8,516,328 B2 * | 8/2013 | Mashino et al. | 455/73 |
| 2006/0184839 A1 | 8/2006 | Golitschek Edler Von Elbwart et al. | |
| 2007/0260959 A1 | 11/2007 | Sidi | |
| 2010/0017680 A1 | 1/2010 | Choi | |
| 2010/0151873 A1 | 6/2010 | Gorokhov et al. | |

OTHER PUBLICATIONS

M. Faulkner—"Offset and IM2 Removal in Direct Conversion Receivers"—IEE Proc. Commun. Col. 149. No. 3, Jun. 2002—6 Pages.

* cited by examiner

Primary Examiner — Thanh Le
(74) Attorney, Agent, or Firm — Barbara R. Doutre

(57) ABSTRACT

A method and apparatus for using erasure to improve signal decoding when data is impacted by an interference event. Embodiments may include receiving in an RF receiver a desired on-channel signal that includes an information signal modulated on to the desired on-channel signal; generating a sampled received signal with an analog-to-digital (A/D) converter; detecting an interference event using an interference detector as well as generating a mask based on the interference event; processing the sampled received signal using the mask to generate decoding data for use by a soft decoder; and, providing the decoding data to the soft decoder.

20 Claims, 5 Drawing Sheets

METHOD AND APPARATUS FOR USING ERASURE TO IMPROVE SIGNAL DECODING DURING AN INTERFERENCE EVENT

BACKGROUND OF THE INVENTION

Communication systems including cellular, mobile, and other wireless communication systems transmit and receive data. In many such wireless communication systems data is carried within a channel by a carrier signal having a frequency corresponding to the center of the channel. Further, wireless communication systems may have several channels each having a carrier signal that is modulated in some manner to carry data across a wireless medium. Further, wireless communication systems may be digital communication systems that carry data as a sequence of symbols that represent data bits. Such data may be encoded to add redundancies to the data stream. Encoding the data provides a robust communication system that allows the RF receiver to recover the transmitted data even though the encoded data may have been impacted by noise, attenuation, and multipath fading due to transmitting the data across the wireless medium. Further, the encoded data may also be impacted by distortion due to components of the RF receiver (e.g., mixers, automatic again control (AGC) attenuators/amplifiers, analog-to-digital converters, etc.). The modulation scheme may comprise a plurality of symbols used to alter a magnitude, phase, or both, of a carrier signal, where each symbol represents a sequence of bits (e.g., each symbol in a Quadrature Phase Shift Keying (QPSK) modulation scheme is one of four carrier phases representing two bits).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
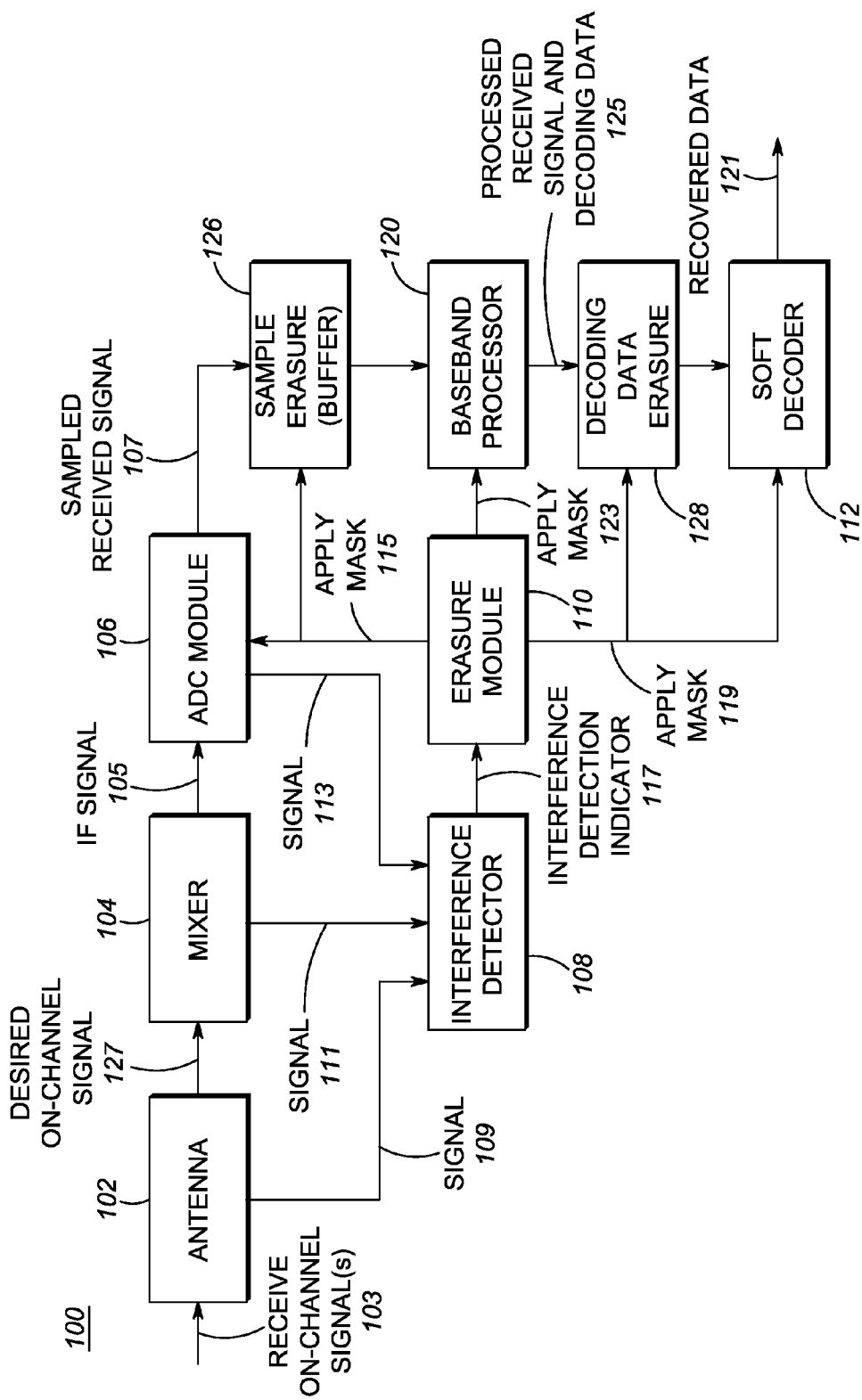
FIG. 1 is a block diagram of a receiver that uses erasure to improve decoding during an interference event in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms. The term module as used herein may also refer to hardware elements that are grouped together according to a specific function or purpose. It is not intended to invoke means-plus-function treatment under 35 U.S.C. Sec. 112.

This disclosure includes embodiments of a method and apparatus for using erasure to improve decoding when data is impacted by an interference event. A RF receiver used in wireless communication systems may receive a plurality of carrier signals each within a different frequency channel. Further, a desired carrier signal received within a frequency channel (on-channel signal) by the RF receiver may be interfered with by a signal from another frequency channel (off-channel). Such an event may be an example of an off-channel interference event. When the off-channel interfering signal is in a steady state (e.g., either off or on), the RF receiver and/or the encoding of the data within the desired on-channel signal may be robust enough to recover data without the need to retransmit the data even though there may be bit errors due to the steady state interfering signal. However, such an interference event may have the most impact on the decoding process of the data in the desired on-channel signal when the off-channel interfering signal undergoes abrupt changes. This is because the transient interference caused when the off-channel interfering signal turns on and off may introduce erroneous values for data reliability metrics used by a soft decoder. In particular, decoding data that is used by the soft decoder may include various reliability metrics of decoding data that include channel state information (CSI) such as received signal strength indicator (RSSI), log-likelihood ratios (LLR), and the like, that are generated within the receiver. CSI provides a soft decoder with confidence or reliability of received data.

For the purposes of the present disclosure, and in accordance to some embodiments, an interference event may include the occurrence of power fluctuations at a receiver's input or within its analog front end signal processing components due to off channel transmissions from other transmitters, or due to activation of components within the receiver such as step attenuators that may act to adjust a received signal power level.

Further, for the purposes of the present disclosure, a soft decoder is defined as a device that decodes data that has been encoded with an error correcting code, which includes, but is not limited to, Reed Solomon code, Block Product Turbo code (BPTC), Trellis code, etc. The device may include a processor that executes a program to perform the decoding using soft information. Such programs and associated algorithms are widely known in the art. Alternatively, the soft decoder may be implemented in dedicated hardware and/or sequential logic, such as an in a Field Programmable Gate Array, or an Application Specific Integrated Circuit. Many error correcting decoder algorithms, such as those for convolutional codes or BPTC codes, utilize soft information including a log-likelihood ratio (LLR), which is computed for each bit within a sequence or block of received bits. These LLR values assume a real (non-integer value) ranging from 0 to 1 that sets the probability that a particular decode value is valid which is subsequently passed through a decoding algorithm to recover the information bits. In the case of a BPTC code, the decoding algorithm may be a Chase decoding algorithm (see Chase Algorithm: David Chase, A Class of Algorithms For Decoding Block Codes With Channel Measurement Information, IEEE Transactions on Information Theory, VOLUME IT-18, NO. 1, January 1972 which is incorporated by reference in its entirety). In other embodiments using a soft decoder for implementing a convolutional decoder, the decoding algorithm may be a Viterbi decoding algorithm (see Viterbi algorithm: Andrew Viterbi, Convolutional Codes and Their Performance in Communication Systems, IEEE Transactions on Communications Technology, VOL. COM-19, No 5, October 1971, which is incorporated by reference in its entirety), or one of the numerous variations of this algorithm. In the case of using a Trellis code, Euclidean distance metrics are often used for the soft information, and these metrics may further include or be combined with the received signal power (a measure of which is given by the RSSI) which is the soft information then used in the Viterbi decoding algorithm to recover the information bits (see Trellis Coded Modulation: Gottfried Ungerboeck, Trellis-Coded Modulation with Redundant Signal Sets Part 1: Introduction, IEEE Communications Magazine, Vol. 25. No 2, February 1987 which is incorporated by reference in its entirety). Therefore, by reducing the RSSI or LLR by the application of a mask, either directly or indirectly, the soft decoder is provided with more accurate soft information that reflects the uncertainty due to the interference event.

Embodiments described herein apply a mask to improve, either directly or indirectly, the soft decision data provided to a soft decoder, because interference transients may cause the reliability metrics of the decoding data to erroneously indicate a high reliability, when in fact the data is quite unreliable. If no erasure is applied (i.e., application of a mask) to the received data or to the decoding data impacted by the interference event, the erroneous reliability metrics provided to the soft decoder may induce the soft decoder to make decision errors resulting in decoding failure. A need for erasure of received or decoding data, which is generally an indication that the received symbol is unknown, may improve the soft decoder's ability to recover data because it gives the erased symbols no weight or confidence, instead of an erroneously high degree of reliability.

In some embodiments, an interference event may be detected to impact portions of received data. Erasure may be applying a mask to adjust a portion of the impacted received data. In particular, the IQ data from the demodulator may be set to zeros. Indirectly, this in turn results in an RSSI of zero, as the magnitude of any such symbol will be zero. The decoding data is therefore erased indirectly by the application of the mask to the IQ data. In other embodiments erasure may include providing a mask that adjusts a portion of the impacted received data to a value between 0 and 1 (or by a factor of between 0 and 1) depending upon the degree to which the received data has been impacted. In one such embodiment, the IQ data may be reduced in magnitude, which again will indirectly affect the soft decision data provided to the soft decoder. In other embodiments, erasure may be applying a mask to directly adjust a portion of the decoding data corresponding to the impacted received data to a value of zero. In such embodiments, erasure of the decoding data (i.e., CSI) to a value of zero results in assigning no confidence to the received data corresponding to the erased decoding data to the soft decoder. In further embodiments, erasure may include providing a mask that adjusts a portion of the decoding data corresponding to the impacted received data to a value between 0 and 1 depending upon the amount the received data has been impacted.

In additional embodiments, an erasure mask, and applying such a mask may include altering the received signal, or samples of the received signal, with a logic high or low signal to indicate which data portion is valid, a memory address and vector length indicating which portion of buffered data is subject to erasure, an Interrupt Service Request (ISR) which may call a predefined subroutine within a processor to alter data samples or skip data samples, or any combination thereof.

Embodiments of such a method and apparatus include an RF receiver receiving a desired on-channel signal that includes an information signal modulated onto the carrier signal. The information signal may be symbols representing encoded data (e.g., sequence of bits). Embodiments include generating a sampled received signal with an analog-to-digital (A/D) converter. The embodiments include detecting an interference event using an interference detector as well as generating a mask based on the interference event using at least one erasure module. Moreover, embodiments include processing the sampled received signal using the mask to generate decoding data for use by a soft decoder. Also, the embodiments may include providing the decoding data to the soft decoder.

FIG. 1 is a block diagram of a receiver 100 that uses erasure to improve signal decoding during an interference event in accordance with some embodiments. The receiver 100 is configured to receive a plurality of RF signals 103 that includes an information signal modulated on to the desired on-channel RF signal. The information signal may be an encoded bit sequence of data. Further, the data may be modulated using a modulation scheme where a plurality of bits comprises a symbol (e.g., QPSK). Such a symbol is decoded by the baseband demodulator (e.g., ADC module 106, baseband processor 120 and soft decoder 112) that may be considered part of the receiver 100.

Moreover, the receiver 100 includes an antenna module 102 that receives the plurality of RF signals 103 that may include both on-channel desired signal and undesired off-channel interference signals. The antenna module 102 may include an antenna and other associated components such a RF band-specific preselector filter and/or low noise amplifier (LNA) to capture the desired on-channel signal within received signal(s) 103. The output of antenna module 102 is predominately the desired on-channel signal 127 which is then passed to a mixer module 104 that converts (e.g., downconverts) the desired on-channel signal 127 to an intermediate frequency (IF) signal 105 to be further processed to recover the information signal and data. The mixer module 104 may include one or more frequency generation units (FGU), oscillators, phase shifters, amplifiers and filters to facilitate translation (conversion) of the on-channel desired signal 127 to the intermediate frequency signal 105. In one embodiment, the intermediate frequency may be a baseband frequency such that mixer module 104 downconverts the desired on-channel signal 127 to an IF which includes a baseband frequency signal from DC to 100 KHz. In alternative embodiments the IF may be near baseband. In further embodiments, IF may be any frequency low enough to be sampled by an Analog-to-Digital (A/D) converter.

An A/D converter (ADC) module 106 is configured to receive the IF signal 105 and generate a sampled received signal 107. The A/D converter module 106 may include an A/D converter as well as analog filtering, gain stages, digital filters, digital re-sampling stages, and processors to further process the sampled received signal. Further, a baseband processor 120 may be provided to process a sampled received signal 107. In one embodiment, the baseband processor 120 may be a demodulator that acquires the symbol (e.g., sequence of bits) from the sampled received signal 107. Further, the soft decoder module 112 decodes the processed received signal and decoding data 125 to recover the data 121. This may include performing forward error correction decoding of the input of the soft decoder module 112.

In addition, the receiver 100 includes an interference detector 108 configured to receive one or more signals (109, 111, and 113). Such one or more signals (109, 111, and 113) may be processed by the interference detector 108 to determine whether an interference event has occurred and/or impacted any received data. In one embodiment, the antenna module 102 may receive an off-channel signal that interferes with the desired on-channel signal 127. In one embodiment, the interference detector 108 may be wideband transient energy detector that measures power over a broad spectrum or frequency band from a signal 109 from the antenna module 102, and is used to identify significant changes in off-channel power levels. When such significant changes in off-channel power levels are identified, an interference detection indicator signal 117 is provided to an erasure module 110 to indicate that an interference event has occurred. Note that in one embodiment, signal 109 may be an output of a wideband RF filter provided to interference detector 108. Interference detector 108 may process the signal by generating a power measurement, and then processing the power measurements to identify the presence of an interference transient event.

In a further embodiment, the interference detector 108 may be an off-channel detector such as an LNA current event detector, where the LNA receives the desired on-channel signal as well as the off-channel interference, and the transient power fluctuation associated with the event causes high transient variations in the LNA bias current. The bias current may be provided, by way of a current mirror, for example, as signal 109 to the interference detector 108. In this embodiment, the interference detector 108 takes the form of an LNA current event detector that identifies when the LNA current exceeds a threshold. If the LNA current as mirrored through the current mirror transistor, is above a predetermined threshold, then the LNA current event detector provides an interference detection indicator signal 117 to the erasure module 110 to indicate that an interference event has been detected.

In another embodiment, the mixer module 104 may provide a signal 111 to the interference detector 108. In such an embodiment, interference detector 108 may be a DC transient detector that detects a change, or transient, in a DC value of the IF signal 105. The interference detector 108 may take the form of a low pass filter together with transient detector, such as a processor that monitors an average output of the low pass filter, and identifies the presence of a deviation from the average. This may be done using sampling and window filtering of the low pass filter output. When an interference event occurs, a change in the DC value is detected by the interference detector 108, which provides an interference detection indicator signal 117 to an erasure module 110 to indicate that an interference event has been detected.

In a further embodiment, the ADC module 106 may provide a signal 113 to the interference detector 108. In this embodiment, the DC transient may be detected in the output of the ADC through the use of a DC transient detector including low pass filtering and windowing as described above, but where the signal being processed is the data samples from the ADC. In yet a further embodiment, the output of the ADC may be monitored and be signal 113 to detect the presence of clipping, which may also be indicative of a transient interference event by the interference detector 108. In such embodiments, when an interference event is detected by the interference detector 108, and an interference detection indicator signal 117 is provided to the erasure module 110.

Thus, signals (109, 111, 113) can be processed to determine a DC transient event, LNA current event, or RF off-channel event by the interference detector 108 (within interference detector 108 may be a corresponding event detector).

The receiver 100 may include at least one erasure module 110 that is configured to generate a mask based on the one or more interference events. That is, an interference detector 108 detects one or more interference events by processing signals (109, 111, 113) and provides an interference detection indicator signal 117 to the erasure module 110. In some embodiments the interference detection indicator 117 may be called an off-channel event detector flag. When receiving the interference detection indicator signal 117, the erasure module 110 generates the mask, which may include zeroing out values, setting values to one, reducing values by a factor (multiplying by one or more constant values, or by, e.g., bit shifting), or by indicating which data is unreliable and should be ignored, or setting values between 0 and 1, etc.

Referring to FIG. 1, there are several different embodiments in applying a mask (115, 119, 123). As discussed in the present disclosure, a mask may set values of sampled received data or decoding data to zero, one, or some value in between 0 and 1. Further, a mask may be of a different form as discussed in the present disclosure (e.g., a mask may be a logic high or low signal to indicate which data portion is valid, a memory address and vector length indicating which portion of buffered data is subject to erasure, an Interrupt Service Request (ISR) which may call a predefined subroutine within a processor, or any combination thereof).

In one embodiment, the erasure module 110 may use (or apply) the mask 115 to alter the sampled received signal 107 from the ADC 106 that are then used by the baseband processor 120 to generate decoding data 125 which is ultimately processed by a soft decoder module 112. That is, the application of the mask to the sample data signal 107 causes the RSSI and/or the LLR decoding data to be indirectly affected by altering the sampled received signal 107. The RSSI and/or LLR will be effectively reduced, or even set to zero (i.e., the confidence of the corresponding interference impacted received data is low), when the baseband processor operates on the masked data that has been set to all zeroes or ones.

In another embodiment, application of the mask 123 may include identifying unreliable data within the sampled information signal. That is, when the erasure module 110 receives an interference detection indicator 117, the erasure module 110 applies the mask 123 to the sampled received signal by notifying the baseband processor 120 that a certain range of data samples are unreliable. In a further embodiment unreliable data can set to values of all zeros or all ones, for example. The erasure module 110 may provide a range of addresses within mask 123 indicating a buffer storage range containing the unreliable sample data. In another embodiment, the application of the mask 115 may be implemented by setting a number of the samples of the sampled received signal 107 to a value of zero (or ones) thereby effectuating erasure of the number of signal samples in a sample erasure (buffer) 126. Subsequent processing for RSSI and LLR would also be adjusted to accommodate the a priori knowledge of which sample data within signal 107 was subject to erasure.

In an alternative embodiment, the sample data may be unaltered, and the decoding data, which may include channel state information (CSI) (e.g., RSSI and LLR), may be altered directly by the mask. As is known in the art, soft decoder 112 receives and processes the symbol decisions generated by the baseband processor 120 from the sampled received signal 107. The data used by the soft decoder 112 (decoding data) may utilize the RSSI or LLR metrics in its algorithms (depending on the coding used) that indicates a measure of reliability of the baseband processor's symbol decisions. Based on the processing of both the symbol decisions and the RSSI or LLR, the soft decoder 112 determines the transmitted bits. Therefore, in this embodiment, the erasure module 110 or the one or more processors therein is further configured to apply the mask 119 by informing the soft decoder 112 of decoding data that is most likely in error, or by actively changing the decoding data 125 being provided to the soft decoder module 112 by decoding data erasure block 128. Decoding erasure block 128 may be implemented by altering decoding data in a buffer, or by otherwise intercepting data intended for the soft decoder 112 and altering it prior to the decoding operation. The decoding data can be a received signal strength indicator (RSSI) if the recovered data 121 is encoded by trellis code, or it may take the form of log-likelihood ratio (LLR) data if the recovered data 121 is encoded by a Block Product Turbo Code (BPTC). The masked (i.e., altered or erased) decoding data is processed by the soft decoder module 112 to recover the data. In this way, processing the sampled received signal using the mask to generate decoding data for use by a soft decoder is performed by altering the decoding data such as the RSSI or LLR.

In some embodiments, the application of the mask may include processing or analyzing the CSI (e.g., RSSI or LLR) to determine the decoding data that has most likely been affected by the interference event. For example, when a trellis code is used in to encode data, the decoding data includes CSI, which may be in the form of a received signal strength indicator (RSSI). RSSI may be a measure of the signal power, and may be estimated as the square of the I channel symbol sample plus the square of the Q channel symbol sample (sum-of-squares). The erasure module 110 may detect abrupt changes or otherwise analyze the RSSI, such as by determining a variance of the RSSI. If the RSSI-variance suddenly changes (such as by becoming very low as the RSSI values hover around a maximum value), then an interference event is confirmed. The decoding data that is coincident with the RSSI deviation is then masked.

In another example, when BPTC are used to encode data recovered by the receiver 100, the decoding data may include CSI such as a log-likelihood ratio (LLR) for each symbol decision. The erasure module 110 may detect abrupt LLR changes or analyze the variance of the LLR. If the LLR-variance changes abruptly, then an interference event is confirmed, and only the LLR decoding data that is coincident with the LLR deviation is then masked.

The mask may comprise a mask length and one or more mask values. The mask length and one or more mask values are based on one or more parameters such as code length, coding rate, automatic gain control tracking, receive data type and/or a combination thereof. In some embodiments, a full-masking effect may be used during the masking interval such that the masking value is zero over the time period typically associated with the interference transient. A mask value of zero means that the underlying data is completely erased, or zeroed out. In other embodiments, the full mask values can be immediately applied (e.g., a full zeroing of the data samples or of the LLR/RSSI decoding data) and then gradually decreased through the remainder of the interference event time interval by using masking values that gradually change from 0 to 1. A mask value of 1 has no masking effect on the underlying data. Thus, the one or more mask values may be equal to a weighting factor, $w_i$, wherein $0 \leq w_i \leq 1$, and i is an index to a mask position. In some embodiments, the mask may be a window of values ranging from 0 and 1 to provide a more robust recovery of the data impacted by the interference event.

In some embodiments, the mask length may be determined based on the nature of the interference event, and may further be based on empirical testing to find an appropriate mask length. In some embodiments that are configured to detect a plurality of different kind of interference events, the mask length may be varied depending on the type of interference event that is detected. The design choice of mask length may also be affected by the coding rate being used. Generally, the mask length should not exceed the reception efficiency of the code (so that the original data may be recovered from the remaining non-masked data). In view of this constraint, the mask may be reduced based on a decreased coding rate and a decreased code length.

Further, the receive data type may be associated with a data having different coding rates, or even data having no coding, such as certain link protocol data types. In this case, the parameters of one or more masks (115, 119, 123) are set to a value so as to prevent the masking of certain received uncoded data. That is, the recovered data 121 may be formatted according to a link protocol, and, different portions of the recovered data may be of a management data type, synchronization data type, and payload data type. Management and synchronization data types may not have any coding, and are not masked or erased because if such data is further corrupted then there is a greater likelihood of data loss which may result in retransmission of data thereby reducing throughput. Thus, if the data type detected to be masked is of management and/or synchronization data types then the mask value is set to allow the appropriate number of samples until the data type is of a payload data type or other data type that includes sufficient coding gain.

Figure 2:
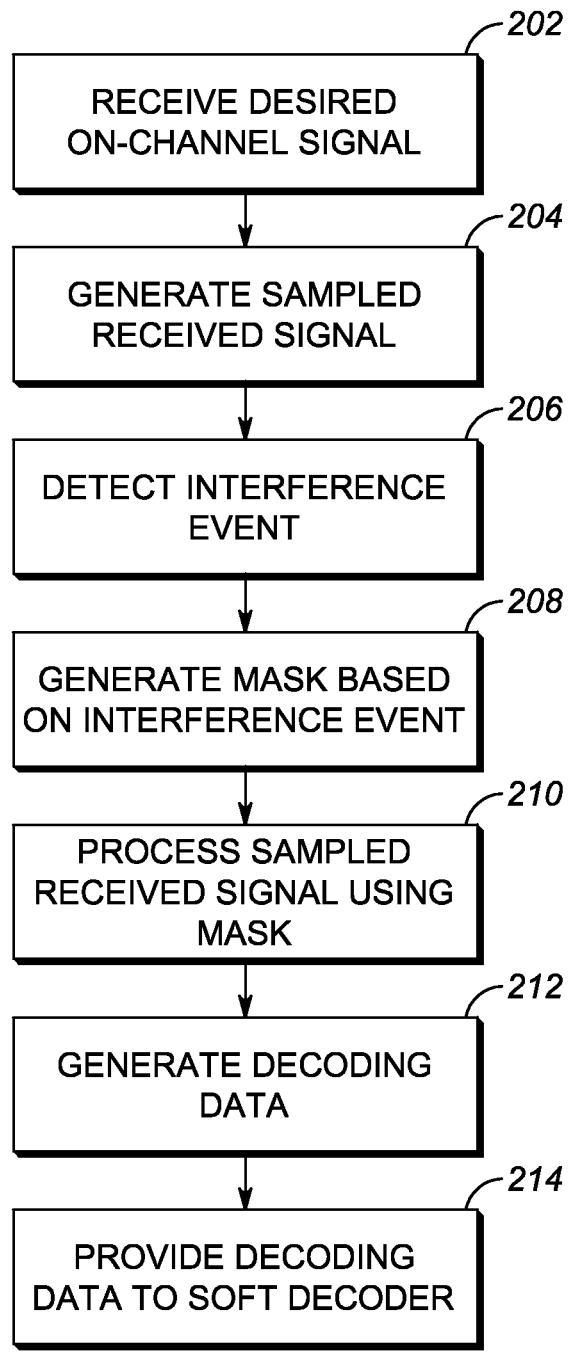
FIG. 2 is a flowchart of a method for using erasure to improve signal decoding during an interference event in accordance with some embodiments.

FIG. 2 is a flowchart of a method 200 for using erasure to improve signal decoding during an interference event in accordance with some embodiments. The method 200 includes a receiver in a communication system receiving a desired on-channel signal that includes an information signal modulated on to the desired on-channel RF signal, as shown in block 202. The information signal may include encoded data modulated onto the desired on-channel signal. The method 200 further includes an analog-to-digital (A/D) converter module generating a sampled received signal, as shown in block 204. The A/D converter module may receive an IF signal as a result of mixing (e.g., down-converting) the desired on-channel signal. Further, the A/D converter module may include filters and other components to process the sampled received signal.

The method 200 additionally includes detecting an interference event using an interference detector, as shown in block 206. In different embodiments, an interference detector may be configured to detect one or more interference events. In one embodiment, an off-channel interference detector may be coupled to an antenna module and detects an off-channel signal that interferes with the desired on-channel signal. Thus, in such an embodiment, the interference detector may be an off-channel detector such as a wideband signal detector.

In a further embodiment, detecting an interference event 206 may encompass the off-channel detector being an LNA current detector. When an LNA receives the desired on-channel signal as well as the off-channel interference event (signal), the bias current is mirrored and provided to a current threshold detector. If the current is above a predetermined threshold, then the LNA current threshold detector provides an interference indicator signal.

In another embodiment, detecting an interference event 206 may encompass a mixer module of the receiver providing a signal corresponding to an interference event to the interference detector. Such an interference detector may be a DC transient detector that detects a change in a DC transient of the IF signal. This may be generated by processing the analog mixer output. When such an interference event is detected, the interference detector provides an interference indicator signal, accordingly.

In a further embodiment, detecting an interference event 206 may encompass the A/D converter module providing an interference event signal to the interference detector. In such an embodiment, processing the sampled data may be performed to identify a DC component transient, or by detecting clipping in the ADC output.

Moreover, the method 200 includes at least one erasure module generating a mask based on the interference event, as shown in block 208. Hence, in some embodiments, the erasure module receives an interference indicator signal that indicates an interference event was detected. Also, the method 200 includes processing the sampled received signal using the mask and to generate decoding data for use by a soft decoder, as shown in blocks 210 and 212, respectively. In several embodiments use of the mask may include applying the mask to portions of the sampled received signal. Such an application of the mask may include identifying unreliable data within the sampled received signal. In one embodiment, the application of the mask sets a number of the samples of the sampled received signal to a value of zero. In another embodiment, the application of the mask flags a data range of the sampled received signal to be set to a value of zero, or to be otherwise ignored. In a further embodiment, the application of the mask may include signaling the A/D converter module that certain memory locations storing the sampled received signal should not be retrieved and forwarded to the baseband processor.

Other embodiments related to processing a sampled received signal using a mask 210 may include applying the mask to the decoding data. The decoding data can be the received signal strength indicator (RSSI) or the log-likelihood ratio (LLR), as described above.

Mask length and one or more mask values are based on one or more parameters. The one or more mask values are equal to a weighting factor, $w_i$, wherein $0 \leq w_i \leq 1$, and i is an index to the mask position. The one or more parameters can include code length, coding rate, automatic gain control tracking, receive data type, and a combination thereof. Masking is not applied or performed, in some embodiments, when the receive data type is associated with a link protocol data type or voice data. The mask length may be configured to be shorter based on signals with relatively smaller coding rates and a relatively smaller code length compared to signals with other coding rates and code lengths. Further, the method 200 includes providing the decoding data to the soft decoder, as shown in block 214. The soft decoder is used to recover the data impacted by the interference event.

Figure 3:
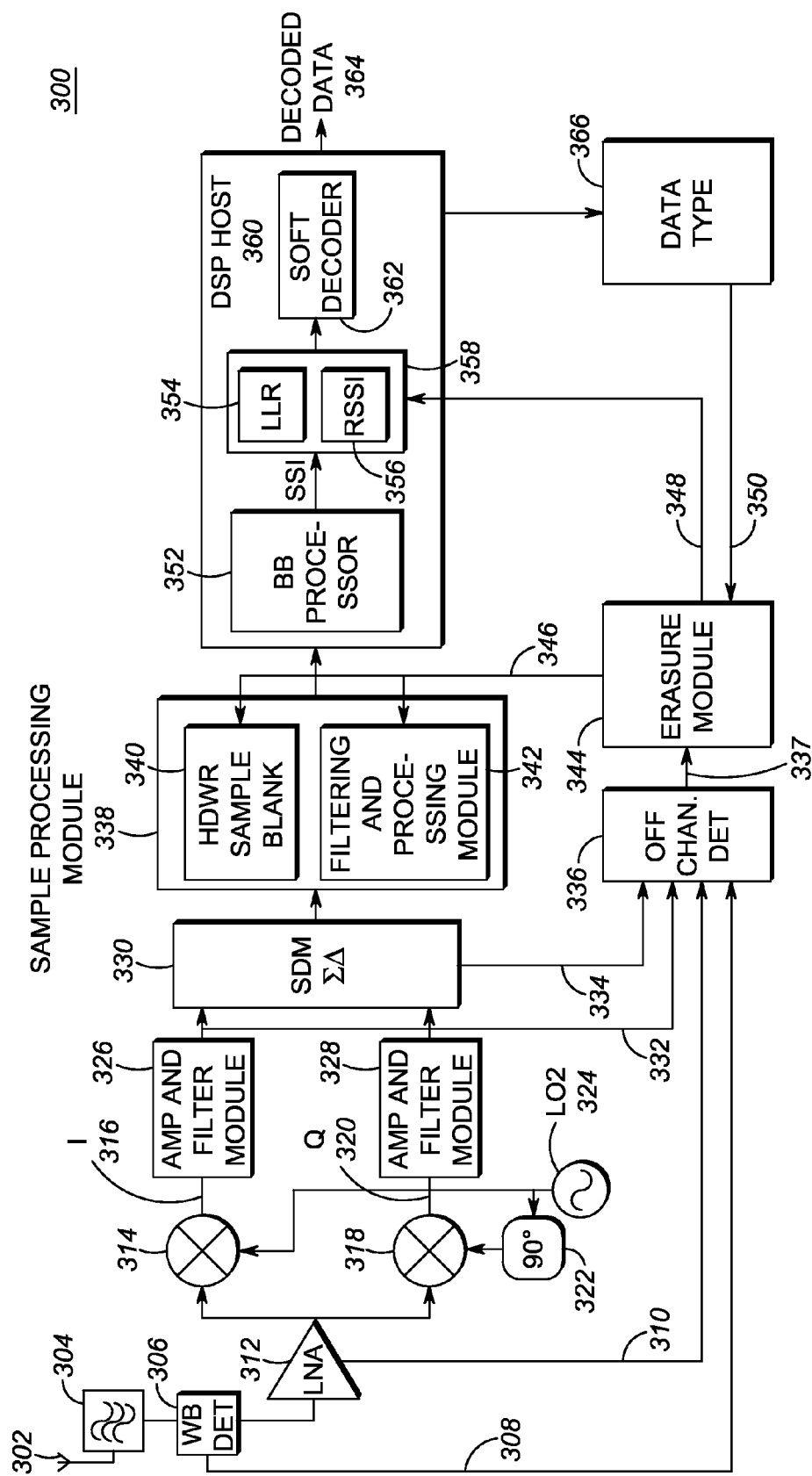
FIG. 3 is a block diagram of another receiver that uses erasure to improve signal decoding during an interference event in accordance with some embodiments.

FIG. 3 is a block diagram of another receiver 300 that uses erasure to improve signal decoding during an interference event in accordance with some embodiments. The receiver 300 includes an antenna 302 that may receive a plurality of signals including a desired on-channel signal. A preselector filter 304 attenuates some undesired out-of band signals, but the RF pass-band bandwidth (BW) is sufficiently wide so as to pass through both the desired on-channel and additional undesired off-channel signals as may be present in the RF pass-band. The receiver 300 may tune filter 304 so as to optimally capture the desired on-channel signal. A wideband (WB) off-channel interference event detector 306 detects an off-channel interference event that may negatively affect the data within a desired on-channel signal. The WB off-channel interference event detector 306 provides an indication of the off-channel interference event to an off-channel interference detector 336 and provides the desired on-channel signal to a low noise amplifier (LNA) 312. The LNA 312 amplifies the desired on-channel signal and passes the desired on-channel signal to down conversion mixers 314 and 318, which mixers translate the on-channel signal to an in-phase (I) channel 316 and a quadrature (Q) channel 320 of the receiver 300.

In one embodiment, the off-channel interference detector 336 may be an RF off-channel detector that detects an off-channel interfering signal that generates the interference event. When such an RF off-channel detector detects and interference event, the RF off-channel detector generates an off-channel detector (OCD) flag (or interference detection indicator signal as discussed in describing FIG. 1). In one embodiment, the WB off-channel interference event detector 306 may be wideband (WB) transient energy detector that measures power over a broad spectrum or frequency band, and identifies significant changes in off-channel power levels. When such significant changes in off-channel power levels are identified, the detector 306 may generate an OCD flag (interference detection indicator signal) on line 308, which is then provided to an erasure module 344 via the off-channel interference detector 336 and line 337. Alternatively, signals on line 308 may be power measurements, and the off channel detector 336 may monitor the power signals to detect the off channel interference transient event and then provide the OCD flag (interference detection indicator signal) to the erasure module 344.

In another embodiment, the off-channel interference detector 336 may be an LNA current threshold detector connected to an LNA 312. In such an embodiment, LNA 312 receives the desired on-channel signal as well as the off-channel interference event (signal) and provides current, on line 310, to the LNA current threshold detector. If the current is above a predetermined threshold, then the LNA current threshold detector generates the OCD flag (interference detection indicator signal) that is provided to the erasure module 344.

In a further embodiment, the off channel interference detector 336 may comprise a Direct Current (DC) transient detector. The DC transient may be determined from analog voltage or current signal measurements via line 332, or by monitoring an output of an A/D converter of a sigma-delta module (SDM) 330 via line 334. The DC transient event may also be caused by an off-channel interference event that impacts data.

The I and Q channels 316, 320 of the receiver 300 each includes a respective mixer 314, 318. A local oscillator 324 generates an oscillator signal used by the mixers 314, 318 to downconvert the desired on-channel signal to an intermediate frequency (IF) signal. Further, the receiver 300 includes a phase shifter 322 to shift the phase of the oscillating signal for the Q channel 320 of the receiver 300. The I and Q channels 316, 320 each further includes a respective amplifier and filter module 326, 328. Such an amplifier and filter module may include a post mixer amplifier (PMA), a low pass filter, and a buffer. The I and Q signals output by the amplifier and filter modules 326, 328 are sampled in parallel by the SDM 330 such that the sampled IQ data is independent and time-aligned. The SDM 330 includes an A/D converter to sample the I and Q signals. The sampled signal from the A/D converter then is routed to a sample processing module 338 that includes a hardware blank module 340 and a filter and processing module 342, and in particular may be routed to either or both of the hardware blank module and the filter and processing module.

As noted above, in one embodiment, the receiver 100 includes an erasure module 344. The off-channel interference detector 336 provides an OCD flag (interference detection indicator signal), via line 337, to the erasure module 344. In one embodiment, if an off-channel interference event is detected, the OCD flag (interference detection indicator signal) acts as a trigger and causes a blank timer module within the erasure module 344 to provide a flag signal on line 346 to the hardware sample blank module 340. The hardware blank module 340 then masks a number of samples of the sampled received signal received from the A/D converter of SDM 330. The mask applied by the hardware sample blank module 340 sets a value of 0 for the number of samples. The filtering and processing module 342 of the sample processing module 338 may include one or more decimation and CIC (cascaded integrator comb) filters as well as a DC Offset Correction (DCOC) circuit, finite impulse response (FIR) filters and an Interface formatting sub-module. In an alternative embodiment, the flag signal may be provided via line 346 to the filtering and processing module 342 to implement the masking.

The receiver 300 further includes a baseband processor 352 that is configured to provide a synchronous signal interface (SSI) signal to a soft decoder 362. In one embodiment, a DSP Host 360 may include the baseband processor 352 and the soft decoder 362. The baseband processor 352 may be provided a sampled received signal from the sample processing module 338. In one embodiment, the baseband processor 352 may be a demodulator that acquires a symbol from the sampled received signal. The baseband processor 352 also may generate decoding data, such as RSSI data 356 or LLR data 354, to be further processed by the soft decoder 362. The soft decoder module 362 decodes the sampled received signal, after processing by baseband processor 352, and the decoding data to recover the data 364. The data may be further processed according to the physical layer and higher levels of the transmission protocol to determine media access control formats, data frames, and the like. In one embodiment, detection of a mid-amble or pre-amble may be used to identify the location of various fields within a received data frame, which may then determine the type of coding and the coding rate, or the lack of coding. In some embodiments, this information is provided as a data type 366 to the erasure module 344 via line 350.

In another embodiment, the erasure module 344 applies a mask to the CSI decoding data (RSSI and/or LLR), generated by baseband processor 352, via an output 348. The masked CSI is provided to the soft decoder 362 to provide recovered data 364. Note that the erasure module 344 also may receive and analyze the CSI. The erasure module 344 may identify transient effects in the CSI to more specifically determine a location of data impacted by the interference event and to apply the mask more effectively. That is, the erasure module 344 may detect abrupt changes or otherwise analyze the CSI (e.g., RSSI or LLR), such as by determining a variance of the CSI. If the CSI-variance suddenly changes (such as by becoming very low as the RSSI values hover around a maximum value), then an interference event is confirmed. The decoding data that is coincident with the CSI deviation is then masked.

A length of the mask, and/or one or more mask values, may be based on one or more parameters. The mask length and values may be predetermined, and some embodiments may provide a plurality of different predetermined masks to accommodate different interference events, different coding rates or lengths, or different data types. The one or more mask values are equal to a weighting factor, $w_i$, wherein $0 \leq w_i \leq 1$, and i is a sample index to the mask position. The one or more parameters can include code length, coding rate, automatic gain control tracking, receive data type, and a combination thereof Masking is not applied or performed when the receive data type is associated with a link protocol data type. For example, masking may not be applied or performed when the receive data type is of a management data type or of a synchronization data type. The mask length may be reduced based on signals with relatively smaller coding rates and a relatively smaller code length compared to signals with other coding rates and code lengths.

Figure 4:
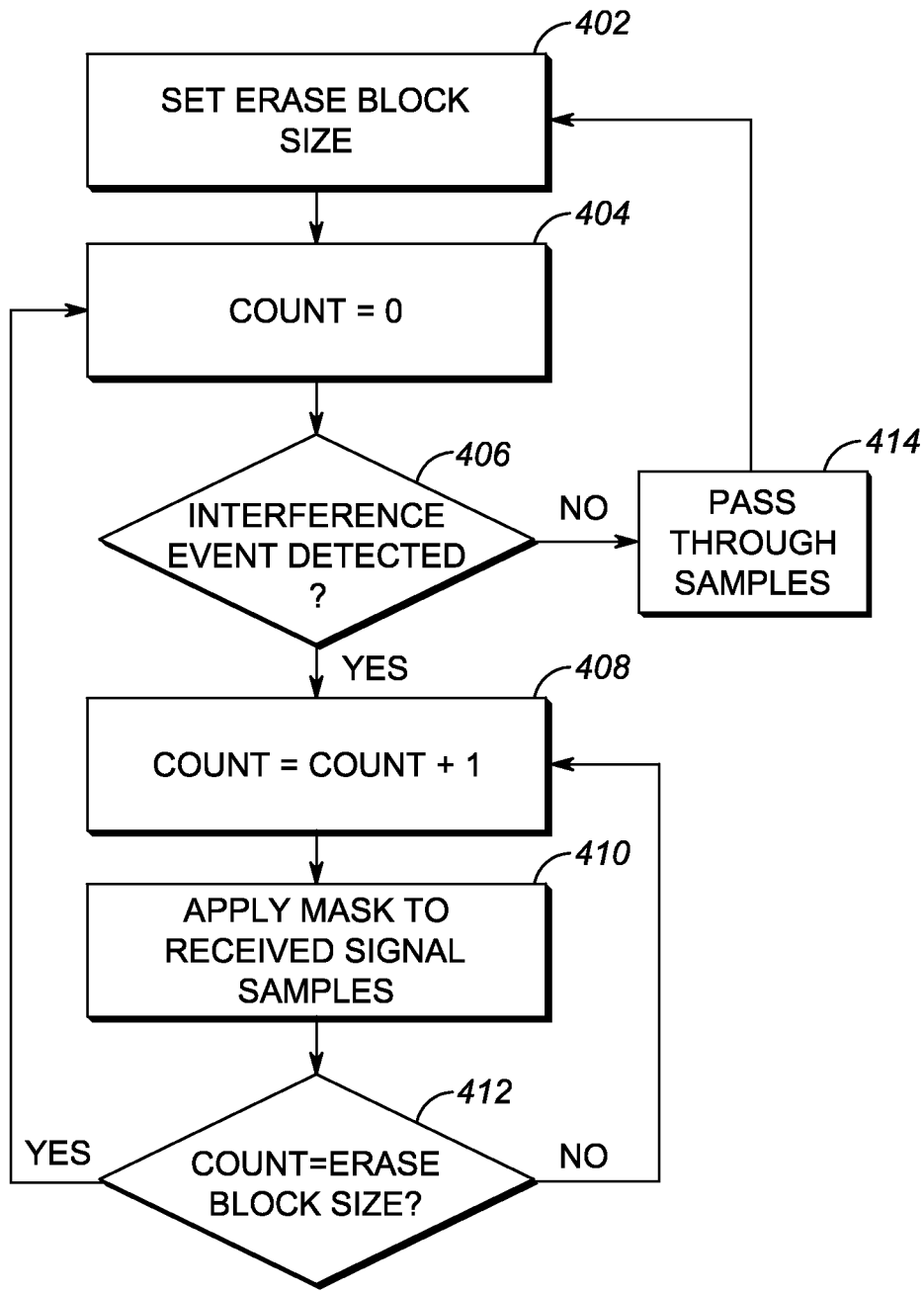
FIGS. 4-5 are flowcharts of methods for using erasure to improve signal decoding during an interference event in accordance with some embodiments.

FIG. 4 is a flowchart of a method 400 for using erasure to improve signal decoding during an interference event in accordance with some embodiments. Such a method 400 may be implemented within an erasure module such as the erasure module 344 depicted in FIG. 3, and is used to asynchronously erase a varying number of samples of the sampled received signal scaled to non-deterministic interference signal responses. Method 400 includes setting an erase block size, as shown in block 402, which may vary depending on specifics of the governing protocol and associated signaling constraints. In embodiments when erasure is performed asynchronously, the erasure module may arbitrarily set an erase block size such that the number of samples erased due to an interference event detected corresponds to the erase block size. The method 400 further includes initializing a counter within the erasure module to 0, as shown in block 404. The method 400 additionally includes determining whether an interference event has been detected, as shown in block 406. The interference event is detected by an interference detector as described in FIGS. 1 and 3 in the present disclosure. If no interference event is detected, then samples of the sampled received signal are passed through and not masked, as shown in block 414. Then the method 400 returns to setting the erase block size, as shown in block 402.

When an interference event is detected, the interference detector provides the erasure module with an interference indicator signal or an OCD flag. In response to the detection of the interference event, a counter is incremented by a value of 1, as shown in block 408. Moreover, in response to the detection of the interference event, the method 400 includes applying a mask to a number of samples of the sampled received signal, as shown in block 410. Also, the method 400 includes determining when the counter is equal to the erase block size, as shown in block 412. If the counter is not equal to the erase block size then the method 400 returns to block 408, where the counter is incremented by a value of one. If the counter is equal to the erase block size, then the method 400 returns to block 404, where the counter is initialized to zero. Having the counter equal the erase block size allows the method 400 to complete masking the number of samples (equal to the erase block size) of the sampled received signal.

Figure 5:
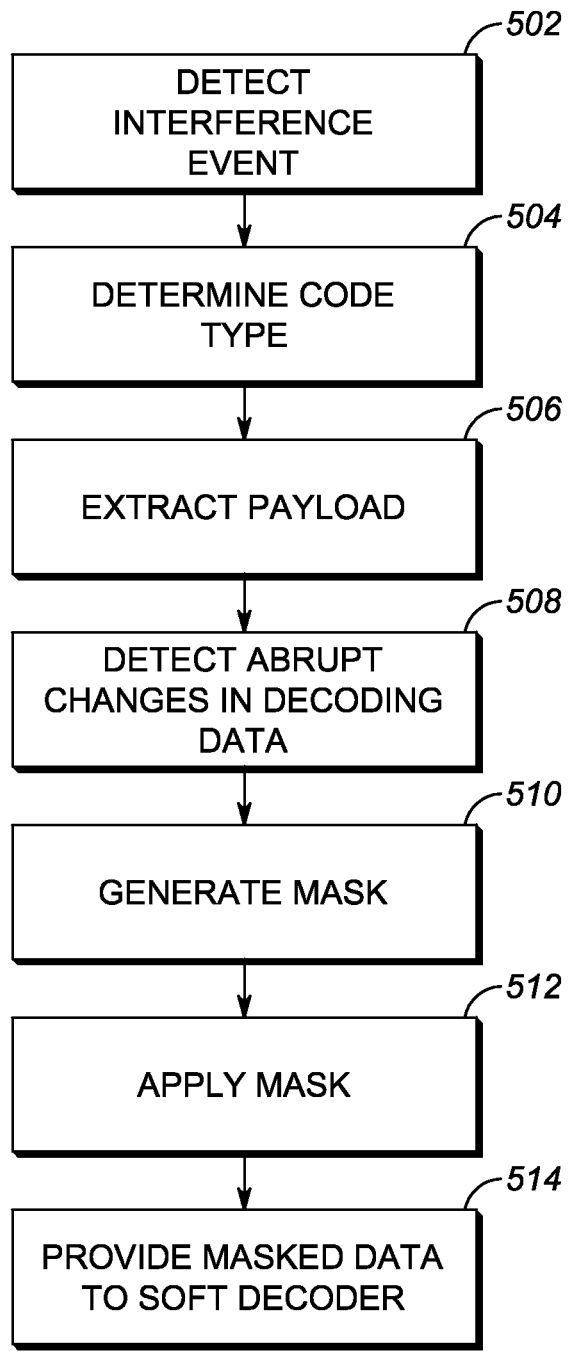

FIG. 5 is a flowchart of a method 500 for using erasure to improve signal decoding during an interference event in accordance with some embodiments. Such a method 500 may be implemented in an erasure module, such as the erasure module 344 depicted in FIG. 3 when operating in a synchronous fashion. The method 500 includes detecting an interference event, as shown in block 502. The interference event may be detected by an interference detector as described in the present disclosure. The method 500 further may include determining the code type used in the coding the data, as shown in block 504. For example, if trellis coding is used then the erasure module may process CSI that includes RSSI. However, if BPTC is used then the erasure module may process LLR. The method 500 additionally includes extracting payload of coded data, as shown in block 506. Data may be formatted into a link protocol format such that the receive data type may be a payload data type, a management data type, or a synchronization data type. Moreover, the method 500 includes the erasure module detecting abrupt changes in decoding data, as shown in block 508. Specifically, the erasure module may detect a variance of the RSSI (for trellis coding) or a variance of the LLR (for BPTC). If the corresponding variance is above (or below) a predetermined threshold, then an interference event may have impacted the receive data. The method 500 also includes generating and applying a mask to the decoding data corresponding to the data impacted by the interference event, as shown in blocks 510 and 512, respectively. However, if the receive data type is a management data type or a synchronization data type, then the mask is not applied to the corresponding decoding data. The method 500 then includes providing the masked data to a soft decoder, as shown in block 514, such that the soft decoder may recover data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
receiving in an RF receiver a desired on-channel signal that includes an information signal modulated on to the desired on-channel signal;
generating a sampled received signal with an analog-to-digital (A/D) converter;
detecting an interference event using an interference detector;
generating a mask based on the interference event;
processing the sampled received signal using the mask to generate decoding data for use by a soft decoder;
providing the decoding data to the soft decoder.

2. The method of claim 1, wherein applying the mask to data includes identifying unreliable data within the sampled received signal.

3. The method of claim 1, wherein the decoding data is selected from the group consisting of a received signal strength indicator (RSSI) and a log-likelihood ratio (LLR).

4. The method of claim 1, wherein a mask length and one or more mask values are based on one or more parameters.

5. The method of claim 4, wherein the one or more mask values are equal to a weighting factor, $w_i$, wherein $0 \leq w_i \leq 1$, and i is an index to the mask position.

6. The method of claim 4, wherein the one or more parameters is selected from the group consisting of code length, coding rate, automatic gain control tracking, amplifier bias current tracking, DC transient response, a type of receive data, and a combination thereof.

7. The method of claim 6, wherein the one or more parameters includes the type of receive data, and wherein masking is not performed when the type of receive data is associated with a link protocol.

8. The method of claim 6, wherein the one or more parameters includes the code length and the coding rate, and wherein the mask length is reduced based on signals with relatively smaller coding rates and a relatively smaller code length compared to signals with other coding rates and code lengths.

9. The method of claim 1 wherein the interference event is selected from the group consisting of an RF off-channel event, a DC transient event, an LNA current event, a CSI-variance event, a RSSI-variance event, and a LLR-variance event.

10. An apparatus comprising:
a radio frequency (RF) receiver configured to receive a desired on-channel signal that includes an information signal modulated on to the desired on-channel signal;
an analog-to-digital (A/D) converter configured to generate a sampled received signal;
an interference detector configured to detect an interference event;
at least one erasure module configured to generate a mask based on the interference event; and,
a processor configured to process the sampled received signal and to use the mask to generate decoding data for use by a soft decoder.

11. The apparatus of claim 10, wherein the processor is further configured to apply the mask that includes identifying unreliable data within the sampled information signal.

12. The apparatus of claim 10, wherein the processor is further configured to apply the mask to the decoding data, wherein the decoding data is selected from the group consisting of a received signal strength indicator (RSSI) and a log-likelihood ratio (LLR).

13. The apparatus of claim 10, wherein the mask comprises a mask length and one or more mask values, and wherein the mask length and one or more mask values are based on one or more parameters, the one or more parameters is selected from the group consisting of code length, coding rate, automatic gain control tracking, a type of receive data and a combination thereof.

14. The apparatus of claim 13, wherein the one or more mask values are equal to a weighting factor, $w_i$, wherein $0 \leq w_i \leq 1$, and i is an index to a mask position.

15. The apparatus of claim 13, wherein the one or more parameters includes the type of receive data, the type of receive data being associated with a link protocol such that the one or more mask value are set to a value of one.

16. The apparatus of claim 13, wherein the one or more parameters includes the code length and the coding rate, and wherein the mask length is reduced based on a decreased coding rate and a decreased code length.

17. The apparatus of claim 10, wherein the interference event is selected from the group consisting of a DC transient event, an LNA current event, an RF off-channel event, a CSI-variance event, a RSSI-variance event, and a LLR-variance event.

18. An article of manufacture comprising a computer readable medium with instructions encoded and stored thereon, the stored instructions, when executed causes the computing device to perform the steps of:
storing a sampled received signal generated by an analog-to-digital (A/D) converter from a received signal, wherein the received signal is a desired on-channel signal that includes an information signal modulated on to the desired on-channel signal;
receiving an interference event input from an interference detector;
generating a mask based on the interference event;
processing the sampled received signal using the mask to generate decoding data for use by a soft decoder;
providing the decoding data to the soft decoder.

19. The article of manufacture of claim 18, wherein the stored instructions, when executed causes the computing device to apply the mask to data including identifying unreliable data within the sampled received signal.

20. The article of manufacture of claim 18, wherein the stored instructions, when executed causes the computing device to apply the mask to the decoding data, wherein the decoding data is selected from the group consisting of a received signal strength indicators and a log-likelihood ratios.

* * * * *